United States Patent [19]

Kubo et al.

[11] Patent Number: 5,272,202
[45] Date of Patent: Dec. 21, 1993

[54] HYDROGENATION PROCESS OF UNSATURATED, NITRILE-GROUP-CONTAINING POLYMER AND AQUEOUS EMULSION OF HYDROGENATED POLYMER

[75] Inventors: Yoichiro Kubo, Yokohama; Kiyomori Ohura, Tokyo, both of Japan

[73] Assignee: Nippon Zeon Co., Ltd., Tokyo, Japan

[21] Appl. No.: 611,568

[22] Filed: Nov. 13, 1990

[51] Int. Cl.$^5$ .................................................. C08F 8/04
[52] U.S. Cl. .................................... 524/565; 524/828; 524/831; 525/339; 525/329.1; 525/329.2; 525/329.3
[58] Field of Search ................. 525/339, 329.1, 329.2, 525/329.3; 524/828, 831, 565

[56] References Cited

U.S. PATENT DOCUMENTS

| | | | |
|---|---|---|---|
| 3,898,208 | 8/1975 | Krause | 525/339 |
| 4,452,950 | 6/1984 | Widerman | 525/339 |
| 4,452,951 | 6/1984 | Kubo et al. | 525/338 |
| 4,464,515 | 8/1984 | Rempel et al. | 525/338 |
| 4,469,849 | 9/1984 | Murrer et al. | 525/339 |
| 4,510,293 | 4/1985 | Kubo et al. | 525/338 |
| 4,746,707 | 5/1988 | Fiedler et al. | 525/338 |
| 4,795,788 | 1/1989 | Himmler et al. | 525/338 |
| 4,853,441 | 8/1989 | Buding et al. | 525/339 |

FOREIGN PATENT DOCUMENTS

| | | |
|---|---|---|
| 223151 | 11/1986 | European Pat. Off. |
| 56-133219 | 10/1981 | Japan . |
| 58-17103 | 2/1983 | Japan . |
| 59-115303 | 7/1984 | Japan . |
| 59-117501 | 7/1984 | Japan . |
| 59-161415 | 9/1984 | Japan . |
| 61-247706 | 11/1986 | Japan . |
| 62-42937 | 2/1987 | Japan . |
| 62-125858 | 6/1987 | Japan . |
| 62-181304 | 8/1987 | Japan . |
| 2-178305 | 7/1990 | Japan .................... 525/339 |

Primary Examiner—Melvyn I. Marquis
Assistant Examiner—Mark Sweet
Attorney, Agent, or Firm—Lowe, Price, LeBlanc & Becker

[57] ABSTRACT

Disclosed herein is a process for the selective hydrogenation of the carbon-carbon double bonds of an unsaturated, nitrile-group-containing polymer with hydrogen in the presence of a hydrogenation catalyst. An aqueous emulsion of the unsaturated, nitrile-group-containing polymer is used. Optionally, an organic solvent capable of dissolving or swelling the polymer is caused to exist at a volume ratio of the aqueous emulsion to the organic solvent in a range of from 1:3 to 1:0. A palladium compound is used as the hydrogenation catalyst. The aqueous emulsion is brought into contact with gaseous or dissolved hydrogen while maintaining an emulsified state.

12 Claims, No Drawings

HYDROGENATION PROCESS OF UNSATURATED, NITRILE-GROUP-CONTAINING POLYMER AND AQUEOUS EMULSION OF HYDROGENATED POLYMER

FIELD OF THE INVENTION

The present invention relates to a process for selectively hydrogenating with hydrogen the carbon-carbon double bonds of an unsaturated, nitrile-group-containing polymer in the form of an aqueous emulsion. This invention is also concerned with an aqueous emulsion of a hydrogenated, nitrile-group-containing polymer saturated to a high degree with hydrogenation and also to a preparation process thereof.

BACKGROUND OF THE INVENTION

A variety of processes have been proposed to date as processes for selectively hydrogenating the carbon-carbon double bonds of an unsaturated, nitrile-group-containing polymer to obtain a highly saturated polymer having a high hydrogenation degree. As a general process, there is a process in which an unsaturated, nitrile-group-containing polymer in a solid form is dissolved in an organic solvent, followed by hydrogenation with hydrogen in the presence of a catalyst (Japanese Patent Application Laid-Open Nos. 117501/1984, 17103/1983, 42937/1987, 125858/1987, 181304/1987, 247706/1986, etc.).

The above process in which the unsaturated, nitrile-group-containing polymer is hydrogenated in the form of a solution does not require particularly complex steps when employed for the hydrogenation of an unsaturated polymer obtained by solution polymerization, because its hydrogenation can be effected by directly introducing a catalyst and hydrogen into a polymer solution obtained after completion of the polymerization reaction. Unsaturated, nitrile-group-containing polymers are however obtained as aqueous emulsions by emulsion polymerization in many instances. Further, saturated polymers obtained after hydrogenation are often employed as aqueous emulsions.

Hydrogenation of an unsaturated, nitrile-group-containing polymer is therefore carried out in the following manner. (1) A reagent is added to an aqueous emulsion obtained by emulsion polymerization, whereby the emulsion is broken to precipitate or coagulate the polymer. The polymer is collected by filtration and then dried to obtain the polymer in a solid form. (2) The solid polymer is dissolved in an organic solvent to provide a solution. While in the form of the solution, the polymer is subjected to hydrogenation in the presence of a catalyst and hydrogen. (4) Thereafter, the solvent is removed from the reaction mixture to obtain a hydrogenated, saturated polymer.

Further, to obtain an aqueous emulsion of the saturated polymer obtained by the hydrogenation, a special step is required for emulsification. As is envisaged from the foregoing, hydrogenation of a polymer in the form of a solution requires to go through many steps. Its practice on an industrial scale hence involves many problems.

Another process has also been proposed, in which an aqueous emulsion of an unsaturated, nitrile-group-containing polymer is added with a solvent capable of dissolving or swelling the unsaturated polymer and also with a catalyst solution, followed by hydrogenation of the polymer in an emulsified state (Japanese Patent Application Laid-Open Nos. 115303/1984 and 133219/1984; U.S. Pat. No. 3,898,208, etc.).

The known processes referred to above however use a costly rhodium (Rh) catalyst as a hydrogenation catalyst. Rh is contained at a level as low as about 0.005 ppm by weight in the earth crust and is an extremely scarce resource. To conduct hydrogenation in the presence of an Rh catalyst on an industrial scale, a serious problem therefore lies from the standpoint of economy. Incidentally, platinum (Pt) or palladium (Pd) is contained at a level as high as about 0.01 ppm by weight in the earth crust.

Further, the process for the hydrogenation of an unsaturated polymer in the form of a latex, which is disclosed in Japanese Patent Application Laid-Open No. 161415/1984, uses hydrazine or a derivative thereof as a hydrogen source. Compared with processes in which economical gaseous hydrogen is used, this process however involves an economical problem for its practice on an industrial scale.

An aqueous emulsion of a saturated (hydrogenated) nitrile-group-containing polymer is useful, for example, as an adhesive for bonding rubber with various fibrous materials by curing. A variety of processes have therefore been proposed for the preparation of such an aqueous emulsion. Of these, the following two processes may be mentioned as principal ones.

According to the first process, an unsaturated, nitrile-group-containing polymer is hydrogenated and from the resulting saturated polymer obtained in a solid form, an aqueous emulsion is prepared by the phase inversion method. Namely, the unsaturated, nitrile-group-containing polymer in the solid form is firstly dissolved in an organic solvent, followed by hydrogenation in the presence of a hydrogenation catalyst and hydrogen. The solvent is thereafter removed to obtain a saturated, nitrile-group-containing polymer in a solid form. Next, the saturated, nitrile-group-containing polymer thus obtained is dissolved in an organic solvent. An emulsifier and water are added to the organic solvent solution, and the resultant mixture is agitated into an emulsified state by a high-speed agitator. The organic solvent is then removed by the steam stripping technique or the like carefully to avoid breakage of the emulsion thus obtained, whereby an aqueous emulsion of the saturated nitrile-group-containing polymer is obtained. This phase inversion method however requires to go through many steps as described above. It is accompanied by another problem that the emulsion obtained as described above has a relatively large average droplet size and can hardly provide sufficient bonding strength when employed as an adhesive.

The second process comprises hydrogenating an unsaturated, nitrile-group-containing polymer as it is, namely, in the form of an aqueous emulsion to retain a state emulsified in water even after the hydrogenation. For example, reference may be had to the process disclosed in U.S. Pat. No. 3,898,208, in which a state emulsified in water is obtained after completion of hydrogenation. This process is however applicable to oil-insoluble conjugated diene polymer latexes. Applicable polymers are hence limited to those already crosslinked three-dimensionally before hydrogenation. This process is therefore not intended for uncross-linked polymers soluble in organic solvents. On the other hand, in the processes disclosed in Japanese Patent Application Laid-Open Nos. 115303/1984 and 133219/1981, respectively, an expensive Rh catalyst is employed as described above. These patent publications are silent about whether a state emulsified in water is retained after hydrogenation or not. These processes are therefore still insufficient as industrial processes for the preparation of an emulsion of a saturated, nitrile-group-containing polymer.

OBJECTS AND SUMMARY OF THE INVENTION

An object of the present invention is to provide a simple and economical process for selectively hydrogenating the carbon-carbon double bonds of an unsaturated, nitrile-group-containing polymer in the form of an aqueous emulsion.

Another object of the present invention is to provide a process for obtaining an emulsion of a hydrogenated (saturated), nitrile-group-containing polymer, in which the average droplet size of the aqueous emulsion is substantially the same as the average droplet size of a corresponding aqueous emulsion before the hydrogenation.

A further object of the present invention is to obtain an emulsion of a hydrogenated (saturated), nitrile-group-containing polymer, which emulsion is useful as an adhesive for bonding rubber and fibers.

With a view toward overcoming the above-described problems of the conventional techniques, the present inventors have carried out an extensive investigation. As a result, it has been found that the above objects can be achieved by hydrogenating, with molecular hydrogen or dissolved hydrogen in the presence of a palladium catalyst, an unsaturated, nitrile-group-containing polymer in the form of an aqueous emulsion or in a form such that the unsaturated, nitrile-group-containing polymer in the aqueous emulsion has been caused to swell with an organic solvent to facilitate approaching of the hydrogenation catalyst to double bonds in the polymer.

It has also been found by the present inventors that suitable selection in kind and amount of the solvent to be added to the aqueous emulsion of the unsaturated, nitrile-group-containing polymer makes it possible to prevent enlargement of droplets in the emulsion and hence to provide an aqueous emulsion of a hydrogenated, nitrile-group-containing polymer, the average droplet size of the last-mentioned aqueous emulsion obtained after the hydrogenation being substantially the same as the average droplet size of the first-mentioned aqueous emulsion before the hydrogenation.

The present invention has now been completed on the basis of these findings.

In one aspect of the present invention, there is thus provided a process for the selective hydrogenation of the carbon-carbon double bonds of an unsaturated, nitrile-group-containing polymer with hydrogen in the presence of a hydrogenation catalyst, in which:

(A) an aqueous emulsion of the unsaturated, nitrile-group-containing polymer is used;

(B) optionally, an organic solvent capable of dissolving or swelling the polymer is caused to exist at a volume ratio of the aqueous emulsion to the organic solvent in a range of from 1:3 to 1:0;

(C) a palladium compound is used as the hydrogenation catalyst; and (D) the aqueous emulsion is brought into contact with gaseous or dissolved hydrogen while maintaining an emulsified state.

In another aspect of the present invention, there is also provided a hydrogenation process for providing an aqueous emulsion of a hydrogenated, nitrile-group-containing polymer, in which the average particle size of an aqueous emulsion of a starting unsaturated, nitrile-group-containing polymer remains substantially the same both before and after the hydrogenation. The hydrogenation process features the use of an organic solvent free of halogenated hydrocarbons and carbon tetrachloride as the organic solvent described above and the existence of such an organic solvent at a volume ratio of the aqueous emulsion to the organic solvent in a range of from 1:1 to 1:0.

In a further aspect of the present invention, there is also provided an aqueous emulsion of a hydrogenated, nitrile-group-containing polymer obtained by either one of the above processes. This aqueous emulsion is useful, in particular, as an adhesive for bonding a rubber and a fibrous material.

DETAILED DESCRIPTION OF THE INVENTION

Features of the present invention will hereinafter be described in detail. (Unsaturated, nitrile-group-containing polymer)

The unsaturated, nitrile-group-containing polymer employed in this invention is typically a copolymer of a conjugated diene and an unsaturated nitrile. It may also be a copolymer containing, as a further copolymer component, a monomer copolymerizable with the conjugated diene and the unsaturated nitrile.

Illustrative of the conjugated diene include butadiene, isoprene, dimethylbutadiene, 1,3-pentadiene, and piperylene.

Exemplary unsaturated nitrile include acrylonitrile and methacrylonitrile.

Examples of the copolymerizable monomer include aromatic vinyl compounds such as styrene, alkylstyrenes and divinylbenzene; unsaturated carboxylic acids and esters thereof, such as acrylic acid, methacrylic acid, itaconic acid, maleic acid, methyl acrylate, ethyl acrylate, butyl acrylate, 2-ethylhexyl acrylate, trifluoroethyl acrylate, and methyl methacrylate; and vinyl esters such as vinyl acetate.

The unsaturated, nitrile-group-containing polymer may be in any polymer form, for example, a random copolymer, a graft copolymer or a block copolymer.

Specific examples of the unsaturated, nitrile-group-containing polymer include butadiene-acrylonitrile copolymers (NBR's), butadiene-methacrylonitrile copolymers, isoprene-acrylonitrile copolymers, acrylonitrile-butadiene-styrene copolymers (ABS's), and butadiene-butyl acrylate-acrylonitrile terpolymers.

These unsaturated, nitrile-group-containing polymers are usually obtained as aqueous emulsions by emulsion polymerization. The average droplet size of an aqueous emulsion of a nitrile-group-containing polymer, said aqueous emulsion being obtained by emulsion polymerization, is generally small, namely, in a range of from about 0.01 $\mu$m to about 0.5 $\mu$m.

No particular limitation is imposed on the concentration of the unsaturated, nitrile-group-containing polymer in the aqueous emulsion before the hydrogenation. To obtain an aqueous emulsion having substantially the same average droplet size both before and after hydrogenation, a concentration of 20 wt. % or lower is however preferred. Concentrations higher than 20 wt. % facilitate coalescing of emulsified droplets, thereby showing the tendency that the average droplet size becomes greater. Upon conducting hydrogenation, an aqueous emulsion of a high concentration may be diluted with water to adjust the concentration.

Emulsifier

As an emulsifier useful in the practice of the present invention to form an aqueous emulsion of an unsaturated, nitrile-group-containing polymer, no particular limitation is imposed on the emulsifier provided that it can afford the unsaturated, nitrile-group-containing polymer by emulsion polymerization. A wide variety of surfactants can be used, including anionic surfactants, cationic surfactants, nonionic surfactants, and amphoteric surfactants.

Exemplary anionic surfactants include soaps, turkey red oil, emulsifying oils, alkyl naphthalene sulfonates, dodecylbenzene sulfonate, oleate salts, alkylbenzene sulfonates, dialkyl sulfosuccinates, lignine sulfonate, alcohol ethoxysulfates, secondary alkanesulfonates, α-olefinsulfonic acids, and Tamol (trade mark).

Illustrative cationic surfactants include alkyl trimethyl ammonium salts, dialkyl dimethyl ammonium salts, alkyl pyrizinium salts, and alkyl benzyl dimethyl ammonium salts.

Nonionic surfactants include, for example, polyoxyethylene alkyl ethers, polyoxyethylene alkyl aryl ethers, polyoxyethylene fatty acid esters, polyoxyethylene sorbitan fatty acid esters, polyoxyethylene oxypropylene block polymers, alkylsulfinyl alcohols, fatty acid monoglycerides, etc.

Amphoteric surfactants include, for example, alkyl betaines, alkyl diethylenetriaminoacetates, and the like.

To keep the emulsion stable during the hydrogenation, one or more of these emulsifers can be incorporated additionally as needed in the course of the hydrogenation.

Organic Solvent

In the present invention, an organic solvent capable of dissolving or swelling the unsaturated, nitrile-group-containing polymer is added to the aqueous emulsion as needed.

By the addition of the organic solvent, the unsaturated, nitrile-group-containing polymer in the aqueous emulsion is caused to swell, thereby to facilitate approaching of the hydrogenation catalyst to double bonds in the polymer. Hydrogenation can therefore be carried out efficiently while maintaining a state emulsified in water.

Specific examples of the organic solvent include aromatic solvents such as benzene, toluene, xylene, and ethylbenzene; halogenated hydrocarbon solvents such as dichloroethane, chloroform, and chlorobenzene; carbon tetrachloride; ketones such as methyl ethyl ketone, acetone, cyclohexanone, and cyclopentanone; esters such as methyl acetate, ethyl acetate, propyl acetate, and butyl acetate; higher alcohols such as diacetone alcohol and benzyl alcohol; ethers such as dioxane and tetrahydrofuran; nitriles such as acetonitrile, acrylonitrile, and propionitrile; and so on. These organic solvents can be used either singly or in combination.

However, to obtain an aqueous hydrogenated polymer emulsion having substantially the same average emulsion droplet size after the hydrogenation as the average droplet size before the hydrogenation, it is desirable to avoid the use of a halogenated hydrocarbon solvent such as chlorobenzene or dichloromethane or carbon tetrachloride.

The organic solvent is used at a volume ratio of the aqueous emulsion to the organic solvent in a range of from 1:3 to 1:0. Although hydrogenation still proceed even if the organic solvent is used in proportions beyond the upper limit of the above range, use of the organic solvent in such an excess proportion however lead to breakage of an emulsion, promoting its separation into a solvent phase and a water phase. This results in the need for additional steps for conducting separation of the water phase and the solvent phase from each other, recovering the hydrogenated polymer from the solvent phase, etc. The process is therefore complicated conversely, thereby failing to achieve simplification of the process, i.e., one of the objects of the present invention. In a volume ratio range of the aqueous emulsion to the organic solvent from 1:3 to 1:1.5, hydrogenation can still be conducted while maintaining an emulsified state. The emulsion may however be broken after the hydrogenation. To retain an emulsified state even after hydrogenation, it is therefore preferable to control the volume ratio of the aqueous emulsion to the organic solvent within a range of from 1:1 to 1:0.

Further, when it is desired to prevent enlargement of the droplets of the emulsion under the hydrogenation conditions so as to make the droplet size of the emulsion after the hydrogenation substantially equal to that before the hydrogenation, the organic solvent is used at a volume ratio of the aqueous emulsion to the organic solvent in the range of from 1:1 to 1:0. If the organic solvent is used in a proportion greater than the upper limit of the above range, the droplets of the resulting emulsion undergo coalescing or breakage during the hydrogenation, thereby making it impossible to attain another one of the objects of the present invention, namely, to obtain an aqueous emulsion of a hydrogenated, nitrile-group-containing polymer, the average droplet size of the last-mentioned aqueous emulsion being substantially unchanged from that of the emulsion before the hydrogenation.

The lower limit of the proportion of the organic solvent to be added is zero. To conduct uniform and efficient hydrogenation, it is however desirable to add the organic solvent at a volume ratio of the aqueous emulsion to the organic solvent in a range of from 1:1 to 1:0.05.

No particular limitation is imposed on the timing of addition of the organic solvent. It can be added either before or after or at the same time as the addition of the hydrogenation catalyst. Where the hydrogenation catalyst is soluble in the organic solvent, it is preferable, from the viewpoint of the efficiency and operation of the hydrogenation, to add the hydrogenation catalyst as a solution in the organic solvent to the aqueous emulsion of the unsaturated, nitrile-group-containing polymer.

Hydrogenation Catalyst

No particular limitation is imposed on the hydrogenation catalyst to be used in this invention, as long as it is a palladium compound which is resistant to decomposition with water.

Specific examples of the palladium compound employed in this invention include, but are not limited to, inorganic palladium compounds and palladium complexes, for example, the palladium salts of carboxylic acids such as formic acid, acetic acid, propionic acid, lauric acid, succinic acid, stearic acid, oleic acid, phthalic acid, and benzoic acid; palladium chlorides such as palladium chloride, dichloro(norbonadiene) palladium, dichloro(benzonitrile) palladium, dichlorobis(triphenylphosphine) palladium, ammonium tetrachloropalladiate(II), and ammonium hexachloropalladiate (IV); palladium bromide; palladium iodide; palladium sulfate dihydrate; and potassium tetracyanopalladiate(II) trihydrate. Of these, the palladium salts of carboxylic acids, dichloro(norbonadiene) palladium, ammonium hexachloropalladiate and the like are particularly preferred.

The amount of the catalyst to be used can be suitably determined from the kind of the polymer to be hydrogenated and the hydrogenation degree intended to achieve. Usually, the catalyst is used at a concentration of from 5 ppm to 6,000 ppm, preferably from 10 ppm to 4,000 ppm based on the polymer. Although the catalyst may be used at concentrations higher than 6,000 ppm, such high concentrations are not economical.

Other Conditions for Hydrogenation

The hydrogenation temperature can be from 0° C. to 300° C., with a range of from 20° C. to 150° C. being preferred. Although temperatures higher than 150° C. are usable, such high temperatures tend to induce side reactions and are not desirable for the selective hydrogenation of carbon-carbon double bonds. The side reactions include, for example, hydrogenation of the organic solvent and hydrogenation of the functional groups in ethylenically unsaturated monomer units in the polymer, such as nitrile groups of acrylonitrile units.

Gaseous hydrogen or dissolved hydrogen is used as a hydrogen source and is brought into contact with the unsaturated nitrile-group-containing polymer.

The hydrogen pressure is in a range of from atmospheric pressure to 300 kg/cm$^2$, with a range of from 5 kg/cm$^2$ to 200 kg/cm$^2$ being preferred. Elevated pressures higher than 300 kg/cm$^2$ are still usable, but they lead to greater inhibitory factors for the practice of the present invention such as a higher initial cost and cumbersome handling. In general, the usable hydrogen pressure ranges from several atm. to several tens atm.

After completion of the hydrogenation, the catalyst can be removed by a conventional catalyst-removing method, for example, by adding an ion-exchange resin or the like to the hydrogenation system to adsorb the catalyst thereon and then removing the thus-adsorbed catalyst by centrifugation or filtration. As an alternative, the catalyst may be allowed to remain in the hydrogenated, nitrile-group-containing polymer as it is without its removal.

Hydrogenated, Nitrile-Group-Containing Polymer and its Aqueous Emulsion

It is possible to proceed with the hydrogenation to such a degree that from 50% to 99.95%, preferably from 85% to 99.95% of the carbon-carbon double bonds of the unsaturated, nitrile-group-containing polymer are hydrogenated. Owing to such a high hydrogenation degree, the resultant hydrogenated polymer is a highly-saturated, nitrile-group-containing polymer.

To obtain an aqueous emulsion of the hydrogenated (saturated), nitrile-group-containing polymer, it is only necessary to remove the solvent, which was added upon the hydrogenation, by a known method such as the conventional steam stripping method.

The thus-obtained aqueous emulsion of the hydrogenated polymer may be concentrated if necessary. Concentration can be effected by a usual method, for example, on a rotary evaporator or high-speed centrifugator, preferably to give a total solid content in a range of from 10 wt. % to 70 wt. %.

The hydrogenated polymer can also be recovered as a hydrogenated (saturated), nitrile-group-containing polymer in a solid form by bringing steam into direct contact with the aqueous emulsion of the hydrogenated polymer or with a hydrogenation mixture in which the emulsified state has been broken or by adding a poor solvent to the aqueous emulsion or the hydrogenation mixture, thereby causing the hydrogenated polymer to precipitate, and then subjecting the precipitate to a drying step such as hot-air drying, reduced-pressure drying or extrusion drying.

ADVANTAGES OF THE INVENTION

Since an unsaturated, nitrile-group-containing polymer can be hydrogenated in the form of an emulsion according to the present invention, the process has been significantly simplified compared with the conventional process that, after an unsaturated, nitrile-group-containing polymer is taken out in a solid form from its polymerization system, the polymer is dissolved in an organic solvent and is then subjected to hydrogenation in the form of the solvent. This invention has also made it possible to conduct hydrogenation in the presence of a palladium catalyst which is economical among noble metal catalysts for hydrogenation. Further, it is also possible to obtain an aqueous emulsion of a hydrogenated, nitrile-group-containing polymer with substantially the same average droplet size as that of the aqueous emulsion before the hydrogenation.

The hydrogenated, nitrile-group-containing polymer according to the present invention, which is in the form of an aqueous emulsion, has extremely strong uncured film strength and cured film strength and excellent oil and heat resistance. It is therefore very useful for treating fibers, e.g., as a binder for non-woven fabrics; for treating paper such as impregnated paper; and as a binder for special impregnated products having oil resistance and for foam rubber, thread rubber and cork.

In addition, the aqueous emulsion of the hydrogenated, nitrile-group-containing polymer, obtained in accordance with the present invention, has an average emulsion droplet size in a very narrow range of from 0.01 $\mu$m to 0.5 $\mu$m, preferably from 0.01 $\mu$m to 0.2 $\mu$m. This average droplet size is smaller than the droplet size of an aqueous emulsion obtained by the phase inversion method, which may become as large as about 2 $\mu$m. Mixed with a resorcinol-formaldehyde resin, the aqueous emulsion of the hydrogenated, nitrile-group-containing polymer is therefore very useful as an adhesive for bonding nitrile-group-containing polymers such as NBR with various fibrous materials such as synthetic fibers, e.g., polyamide fibers or polyester fibers, and glass fibers by curing.

The hydrogenated, nitrile-group-containing polymer in the solid form can be used in a wide variety of fields for its excellent weatherability, cold flexibility, heat resistance, ozone resistance, etc.

EMBODIMENTS OF THE INVENTION

The present invention will hereinafter be described specifically by the following examples. It should however be borne in mind that the present invention is not limited to the following examples only.

Measuring Methods of Physical Properties

Each hydrogenation degree in this invention was determined by the iodine number method (JIS K0070 was followed), while the average droplet size of each emulsion in this invention was ascertained electron microscopically.

EXAMPLE 1

An acrylonitrile-butadiene copolymer (hereinafter abbreviated as "NBR") having a bound acrylonitrile content of 39.4 wt. % was chosen as an unsaturated, nitrile-group-containing polymer, and was hydrogenated in an autoclave having an internal capacity of 1 l.

An emulsion of the above NBR (emulsifier: fatty acid soap) was charged in an amount of 100 ml (polymer content: 10 g) in an autoclave. Nitrogen gas was caused to flow to remove dissolved oxygen.

Palladium acetate was chosen as a catalyst. Its 63.3 mg (Pd:polymer=3,000 ppm) were dissolved in 160 ml of acetone/benzene (1:1) and then added (emulsion:organic solvent=1:1.6). After the interior of the autoclave was purged twice with hydrogen gas, the interior was pressurized to 30 atm with hydrogen gas, and the contents were heated to 50° C., at which they were reacted for 6 hours.

The hydrogenation degree of the resultant hydrogenated polymer is shown in Table 1.

EXAMPLE 2

Hydrogenation was conducted as in Example 1 except that palladium benzoate was chosen as a catalyst and its 97.7 mg (Pd:polymer=3,000 ppm) were added as a solution in 50 ml of benzene (emulsion:organic solvent =1:0.5).

EXAMPLE 3

Hydrogenation was conducted as in Example 1 except that dichloro(norbornadiene) palladium was chosen as a catalyst and its 76.6 mg (Pd:polymer=3,000 ppm) were added as a solution in 10 ml of propionitrile (emulsion:organic solvent=1:0.1).

EXAMPLE 4

Hydrogenation was conducted as in Example 1 except that ammonium hexachloropalladiate(IV) was chosen as a catalyst and its 100.2 mg (Pd:polymer=3,000 ppm) were added as a solution in 40 ml of ethyl acetate (emulsion:organic solvent=1:0.4).

EXAMPLE 5

Hydrogenation was conducted as in Example 1 except that a butadiene-butyl acrylate-acrylonitrile terpolymer (acrylonitrile content: 35 wt. %, butyl acrylate content: 30 wt. %, emulsifier: fatty acid soap) was used as an unsaturated, nitrile-group-containing polymer and 84.4 mg of palladium acetate were added as a solution in 160 ml of a 1:1 mixed solvent of chlorobenzene and acetone (emulsion:organic solvent=1:1.6).

The hydrogenation degrees of the hydrogenated polymers obtained in Examples 1-5 are collectively shown in Table 1.

TABLE 1

| | Unsaturated polymer | Emulsion:organic solvent (volume ratio) | Hydrogenation catalyst (kind, proportion) | Degree of hydrogenation | Remarks |
|---|---|---|---|---|---|
| Ex. 1 | Nitrile content = 39.4 wt. % | Emulsion:benzene:acetone = 1:0.8:0.8 | Palladium acetate Pd:polymer = 2,000 ppm | >99.9% | Emulsified state broken after hydrogenation |
| Ex. 2 | Nitrile content = 39.4 wt. % | Emulsion:benzene = 1:0.5 | Palladium benzoate Pd:polymer = 4,000 ppm | 90.2% | Emulsified state retained after hydrogenation |
| Ex. 3 | Nitrile content = 39.4 wt. % | Emulsion:propionitrile = 1:0.1 | Dichloro(norbornadiene) palladium Pd:polymer = 4,000 ppm | 89.5% | Emulsified state retained after hydrogenation |
| Ex. 4 | Nitrile content = 39.4 wt. % | Emulsion:ethyl acetate = 1:0.4 | Ammonium hexapalladiate Pd:polymer = 3,000 ppm | 93.7% | Emulsified state retained after hydrogenation |
| Ex. 5 | Nitrile content = 35 wt. % BA[1)] content = 30 wt. % | Emulsion:benzene:acetone = 1:0.8:0.8 | Palladium acetate Pd:polymer = 3,000 ppm | 95.2% | Emulsified state broken after hydrogenation |

[1)]BA: Butyl acrylate.

As is apparent from Table 1, according to the present invention, an unsaturated, nitrile-group-containing polymer can be hydrogenated in the form of an emulsion. It is understood that a hydrogenated, nitrile-group-containing polymer saturated to a high degree can be obtained accordingly.

EXAMPLE 6

An acrylonitrile-butadiene copolymer having a bound acrylonitrile content of 39.4 wt. % (average droplet size of emulsion: 0.09 μm) was chosen as an unsaturated, nitrile-group-containing polymer, and was hydrogenated in an autoclave having an internal capacity of 1 l.

An emulsion of the above NBR (emulsifier: fatty acid soap) was charged in an amount of 100 ml (total solid content: 12 g) in an autoclave. Nitrogen gas was caused to flow for 10 minutes to remove dissolved oxygen. Palladium acetate was chosen as a catalyst. Its 38.0 mg (Pd:polymer=1,500 ppm) were dissolved in 60 ml of acetone and then added (emulsion:organic solvent=1:0.6). After the interior of the autoclave was purged twice with hydrogen gas, the interior was pressurized to 30 atm with hydrogen gas, and the contents were heated to 50° C., at which they were reacted for 6 hours. Thereafter, the organic solvent was removed on an evaporator.

The hydrogenation degree of the resultant hydrogenated NBR, the state of the emulsion, and the average droplet size of the emulsion are shown in Table 2.

EXAMPLE 7

Hydrogenation was conducted as in Example 6 except that palladium propionate was chosen as a catalyst and its 85.4 mg (Pd:polymer=3,000 ppm) were added as a solution in 10 ml of benzene (emulsion:organic solvent=1:0.1).

EXAMPLE 8

Hydrogenation was conducted as in Example 6 except that an acrylonitrile-butadiene copolymer having a bound acrylonitrile content of 45.1 wt. % (average emulsion droplet size: 0.1 μm, emulsifier: fatty acid soap) was used as an unsaturated, nitrile-group-containing polymer, palladium acetate was chosen as a catalyst, and its 67.5 mg (Pd:polymer=4,000 ppm) were added as a solution in 20 ml of cyclohexanone to 100 ml (total solid content: 8 g) of the above NBR emulsion (emulsion:organic solvent=1:0.2).

EXAMPLE 9

Hydrogenation was conducted as in Example 6 except that dichloro(norbornadiene) palladium was chosen as a catalyst and its 80.4 mg (Pd:polymer=4,000 ppm) were added as a solution in 10 ml of acetone (emulsion:organic solvent=1:0.1).

The hydrogenation degrees of the resultant hydrogenated NBR's obtained in Examples 6-9, the states of the emulsions, and the average droplet sizes of the emulsions are shown collectively in Table 2.

In view of the results of Table 2, it is understood that an emulsion having substantially the same average droplet size even after hydrogenation as the average emulsion droplet size before the hydrogenation can be obtained when an organic solvent is used in a small proportion not greater than the 1:1 volume ratio of the emulsion to the organic solvent.

TABLE 2

| | Polymer Concentration (wt. %) | Emulsion:organic solvent (volume ratio) | Hydrogenation catalyst (kind, proportion) | Degree of hydrogenation | State and average droplet size (μm) of emulsion after hydrogenation |
|---|---|---|---|---|---|
| Ex. 6 | 12 | Emulsion:acetone = 1:0.6 | Palladium acetate Pd:polymer = 1,500 ppm | 93.2% | Stable emulsified state. Average droplet size: 0.09 |
| Ex. 7 | 12 | Emulsion:benzene = 1:0.1 | Palladium propionate Pd:polymer = 4,000 ppm | 95.8% | Stable emulsified state. Average droplet size: 0.09 |
| Ex. 8 | 8 | Emulsion:cyclohexanone = 1:0.1 | Palladium acetate Pd:polymer = 4,000 ppm | 88.3% | Stable emulsified state. Average droplet size: 0.1 |
| Ex. 9 | 8 | Emulsion:ethyl acetate = 1:0.1 | Dichloro(norbornadiene) palladium Pd:polymer = 3,000 ppm | 94.5% | Stable emulsified state. Average droplet size: 0.1 |

We claim:

1. In a process for the selective hydrogenation of the carbon-carbon double bonds of an unsaturated, nitrile-group-containing polymer with hydrogen in the presence of a hydrogenation catalyst, the improvement wherein:

(A) an aqueous emulsion of the unsaturated, nitrile-group-containing polymer is used;
(B) an organic solvent capable of dissolving or swelling the polymer is caused to exist at a volume ratio of the aqueous emulsion to the organic solvent in a range of from 1:1 to 1:0.05;
(C) a palladium compound is used as the hydrogenation catalyst; and
(D) the aqueous emulsion is brought into contact with gaseous or dissolved hydrogen while maintaining an emulsion state.

2. The process of claim 1, wherein the organic solvent is at least one solvent selected from the group consisting of aromatic compounds, halogenated hydrocarbons, carbon tetrachloride, ketones, esters, higher alcohols, ethers and nitriles.

3. The process of claim 1, wherein the organic solvent is free of halogenated hydrocarbons and carbon tetrachloride.

4. The process of claim 3, wherein the organic solvent is at least one organic solvent selected from the group consisting of aromatic compounds, ketones, esters, higher alcohols, ethers and nitriles.

5. The process of claim 3, wherein the aqueous emulsion of the unsaturated, nitrile-group-containing polymer has an average droplet size in a range of from 0.01 μm to 0.5 μm and affords an aqueous emulsion of a hydrogenated, nitrile-group-containing polymer, the average droplet size of the latter aqueous emulsion having been maintained substantially the same as that of the former aqueous emulsion.

6. The process of claim 1, wherein the palladium compound is at least one palladium compound selected from the group consisting of the palladium salts of carboxylic acids, dichloro(norbornadiene) palladium and ammonium hexachloropalladiate.

7. The process of claim 1, wherein the hydrogenation is conducted to a hydrogenation degree such that 50% to 99.95% of the carbon-carbon double bonds of the unsaturated, nitrile-group-containing polymer are hydrogenated.

8. The process of claim 1, wherein the unsaturated, nitrile-group-containing polymer is a copolymer composed, as copolymer components, of a conjugated diene and an unsaturated nitrile and optionally, a further monomer copolymerizable with the conjugated diene and the unsaturated nitrile.

9. The process of claim 1, wherein the aqueous emulsion contains the unsaturated, nitrile-group-containing polymer at a concentration not higher than 20 wt. %.

10. The process of claim 1, wherein the hydrogenation is conducted using the palladium compound in a concentration range of from 5 ppm to 6,000 ppm and controlling the temperature in a range of from 0° C. to 300° C. and the hydrogen pressure in a range of from atmospheric pressure to 300 kg/cm$^2$.

11. An aqueous emulsion of a hydrogenated, nitrile-group-containing polymer, obtained in accordance with the process of claim 1.

12. The aqueous emulsion according to claim 11, which is an adhesive for bonding a rubber and a fibrous material.

* * * * *